Patented Jan. 25, 1938

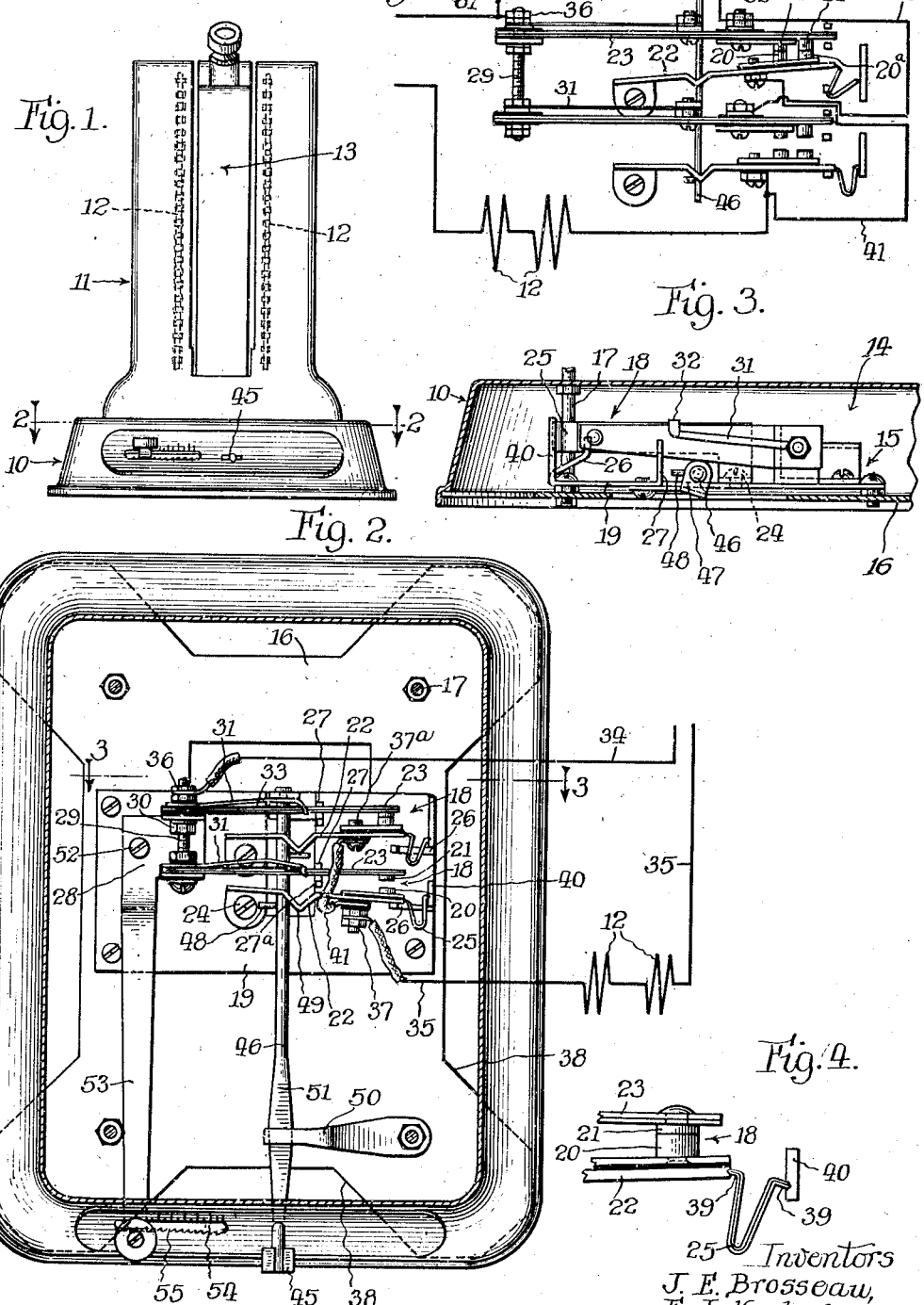

2,106,269

UNITED STATES PATENT OFFICE 2,106,269

CONTROL DEVICE

Joseph E. Brosseau, West Chicago, and Frank J. Kerber, Chicago, Ill.; said Kerber assignor to said Brosseau Application May 2, 1931, Serial No. 534,644
Renewed November 23, 1937

8 Claims. (Cl. 200—122)

The invention relates generally to control devices and more particularly to such devices adapted for controlling electric toasters and the like.

Toasters and similar heating and cooking apparatus have in the past been automatically controlled through the use of timing devices embodying clock mechanism acting to terminate each toasting operation after a predetermined length of time. Such control devices are quite complicated and expensive, and for this reason are objectionable. In addition, it has been found that as successive heating or toasting operations are performed with such apparatus a residual temperature is built up in the apparatus which causes undesirable variation in the resulting food product when clock mechanism is employed as a control means.

An important object of the present invention is, therefore, to provide an improved control device for toasters and like apparatus employing a simple and inexpensive thermostatic means acting in the nature of a timing device to terminate the operation of the apparatus after a predetermined period of time.

A further object is to provide a control device for toasters and the like, adapted to compensate automatically for variation in the residual temperature in the apparatus and thus produce a uniform food product.

Another object is to provide a control device of this character adapted for frequent operation through the use of a pair of switches each governed by separate thermo-responsive means which is heated when the associated switch is closed and separately operative to control the flow of current to the heating elements of a toaster or the like, together with means for rendering the switches operative alternately so as to permit cooling of each thermo-responsive means after it has been heated and thus insure uniformity in successive operations.

Another object is to provide a control device having two switches selectively operative to close an electric circuit, with thermally responsive means operable as a timing means to control the operation of each of the switches and including heating elements controlled by their respective switches, and means operable to adjust the timing period of said thermally responsive means.

The above and other objects are attained in the present embodiment of the invention through the provision of a control unit for an electric heating element having a manually closed switch arranged to be opened automatically by means of a thermostat with which is associated an auxiliary electric heating element governed by the switch. The thermostat and its auxiliary heating element thus constitute a thermo-responsive means acting as a timing device, and two such thermo-responsive means are employed in each control unit, together with means for rendering the devices operative in succession so as to permit cooling of each thermo-responsive means after it has been heated and thereby insure uniformity in successive operations.

In the accompanying drawing

Figure 1 is a front elevational view of a toaster embodying the features of the invention.

Fig. 2 is an enlarged plan view taken along the line 2—2 of Fig. 1 showing the control device in association diagrammatically with the heating element of the toaster.

Fig. 3 is a fragmental sectional view taken along the line 3—3 of Fig. 2.

Fig. 4 is an enlarged fragmental portion of Fig. 2 showing the spring employed to impart over-center movement to the switch member.

Fig. 5 is an alternative embodiment of the invention employing electrical means for varying the timing period.

For purposes of disclosure the invention is illustrated in the drawing and will hereinafter be described in detail as applied to a control unit adapted for permanent association with a toaster or the like, but it is to be understood that this disclosure is not intended as a limitation of the invention to use with a toaster, to the particular location of the control unit with the device controlled, nor to the particular construction of the unit, it being contemplated that various changes may be made by those skilled in the art to adapt the invention to other types of apparatus and to other types of control units without departing from the spirit and scope of the invention as defined by the appended claims.

In the form illustrated the invention is embodied in a control device permanently associated with a toaster having a base 10 with a casing 11 upstanding therefrom to form a chamber for heating elements 12 between which the bread to be toasted is supported by a movable carrier 13. As shown in Fig. 3, the base 10 is formed from sheet metal to provide an auxiliary chamber or housing 14 for a control device 15 carried upon a horizontal wall 16 which substantially closes the lower side of the chamber 14 and is secured in position by a plurality of vertically extending bolts 17.

The control device preferably embodies two thermostatically controlled switches 18 of similar construction mounted on a base plate 19 secured within the chamber 14 on the upper side of the wall 16. Each switch 18 is, in the present case, of the over-center or toggle type comprising two opposed contacts 20 and 21 carried respectively on the free ends of a pivoted switch member 22 and a bimetallic thermostatic element 23. The other end of the switch member 22 is pivoted at 24 to the base plate 19 and, under the control of an over-center spring 25, the member 22 may be moved between an open position determined by a lug 26, and a closed position wherein the contacts 20 and 21 are engaged. The closed position of the switch member 22 is determined by engagement with the thermostatic element 23, which moves between spaced stops 27 and 27ᵃ on the base and is mounted in insulated relation on a mounting member 28 by a bolt 29 and nuts 30.

Closing movement of the switch 18 is in the present case effected manually, and the opening thereof is caused automatically by heating of the thermostatic element 23, which when heated moves the switch member 22 past its over-center position. In order that the thermostatic element may act as a timing means in opening the switch 18, it is heated only while the switch 18 is closed, and to this end an auxiliary heating element 31 controlled by the switch 18 is mounted in heating relation to the thermostatic element 23. Thus as shown in Figs. 2 and 3, the heating element 31 at one of its ends is electrically and mechanically connected to the bolt 29 and extends along the thermostatic element 23 and is connected electrically and mechanically to the element 23 at a point spaced from the bolt 29 by means of a clip 32. A mica sheet 33 positioned between the elements 23 and 31 serves as an electric insulator so as to insure passage of the electricity through the heating element 31.

In use, the switch 18 is connected in series with the heating elements 12 and a suitable power source by conductors 34 and 35. The conductor 34 leads from one side of the power source and is connected to a wire terminal 36 formed by the bolt 29, while the conductor 35 is in series with the heating elements 12 and the other side of the power source and is connected to a wire terminal 37 mounted in insulated relation on the switch member 22. The wire terminal 37 is electrically connected to the contact 20 which is preferably insulated from the switch member 22.

Thus it will be seen that when the switch 18 is closed, current will flow through the circuit and heating of the elements 12 and 31 will be started, and will continue until the thermostatic element 23 has been heated sufficiently to cause opening of the switch 18. In this action, the thermostatic element 23 and its associated heating element serve as a timing device which compensates automatically for any residual temperature built up in the toaster by repeated operation thereof. Such automatic compensation for variation in the residual heat of the toaster results from the fact that the thermostatic element 23 and the housing 14 are heated by the element 31 to an extent which bears a definite relation to the heating of the toaster by the elements 12. Thus by constructing the housing 14 so as to dissipate heat at a rate which bears a predetermined relation to the rate of heat dissipation of the toasting chamber, the desired compensating action of the control device may be obtained. In the present case the proper balance between the temperatures built up in the toasting chamber and the housing 14 is obtained by providing ventilating openings 38 in the wall 16 of the housing.

The over-center spring 25 is preferably of U-shaped form as shown in Figs. 2 and 4 of the drawing so that it is of compact character and may be mounted beyond the free end of the switch member 22 in a remote position with relation to the heating element 31. In this position the spring 25 is not subject to the direct heat of the element 31, but to insure long life in the spring, it is preferably made from thermostatic metal tending to increase the expansive force of the spring as it is heated. To mount the spring 25, ears 39 are formed at the ends thereof with knife edges thereon to engage opposed notches formed respectively in the end of the switch member 22 and in a lug 40 upstanding from the base plate 19. By the use of a spring of this type it has been found that the assembly of the device is simplified, its size maintained at the minimum, and unusual sensitiveness is obtained in the switch operation.

As above pointed out, two thermostatically controlled switches 18 are provided in the present embodiment of the invention, both switches 18 being of the same general construction and being mounted side by side on the base plate 19. The two thermostatic elements 23 are secured to the mounting member 28 by the same bolt 29 which electrically connects the two heating elements 31 in parallel. The other contacts 20 of the two switches are connected in parallel by a flexible conductor 41 secured to the wire terminal 37 and a similar insulated terminal 37ᵃ on the other switch member 22. Thus the switches 18 are operative selectively to close the circuit to the heating elements 12 of the toaster.

When one of the switches 18 is used to time an operation of the toaster, the temperature of its thermostatic element 23 is raised materially, and the other switch 18 is therefore used for the next toasting operation so as to allow the thermostatic element 23 of the first switch an opportunity to cool. Thus the toasting operations may follow each other in close succession and the timing action of the thermostatic control means is uniform and produces uniformly toasted bread.

In order to insure control of successive operations by alternate devices, means is provided capable of closing the switches 18 only in rotation and in the present instance this means comprises a handle 45 positioned at the front of the toaster and having a shaft 46 extending into the chamber 14 and between the base plate 19 and the switch members 22. The inner end of the shaft 46 is journaled in a bracket 47 secured to the base plate 19 as shown in Fig. 3. In successive one-half revolutions of the shaft 46 in a clockwise direction (Fig. 1), pins 48 projecting radially in opposite directions from the shaft 46 are arranged alternately to engage cam surfaces 49 (Fig. 2) formed on the switch members 22 so as to close the switches in rotation, it being understood that the switches are opened by the action of the thermostatic elements 23. Rotation of the shaft 46 in a counter-clockwise direction is prevented by the abutting of the pin 48 with the lower edge of the offset forming the cam 49. The shaft is thereby confined to clockwise rotation and thus insures that without thought on the part of the operator the switches will be closed in alternate succession. A spring 50 engaging a flattened portion 51 on the shaft serves to hold the shaft 46 in the proper rotative position and to determine the amount of movement necessary to close the switches.

Often it is desirable to vary the timing of a toasting operation, and the present invention provides two alternative means for attaining this end. In the form shown in Figs. 1 to 2, this means is arranged to provide for mechanical adjustment of the two thermostatic elements 23 simultaneously so as to vary the amount of heat which must be applied thereto in order to open the switches. This means includes the mounting member 28 which is pivotally mounted on the base plate 19 by means of a bolt 52 so that it may be pivoted to move the thermostatic elements 23 simultaneously into engagement with the stops 27 so as to apply tension to the elements. To shift the mounting member 28, an arm 53 is connected thereto and extends through a slot 54 in the forward wall of the toaster base 10 and the desired adjustment of the thermostatic elements may be maintained by engagement of the arm 53 with teeth 55 formed along the lower edge of the slot 54.

This operation adjusts the thermostatic elements in unison so that for any particular adjustment the successive toasting operations will be substantially uniform.

In the form illustrated in Fig. 5, the variation in the timing of the control device is obtained by providing a shunt circuit about each of the heating elements 31 and controlled by the same switch as the heating element, together with means for varying the resistance in the two shunt circuits. Preferably, a single rheostat is employed to adjust the resistance of both of the shunt circuits.

Thus as shown in Fig. 5, each of the thermostatic elements 23 is provided with two contacts 21 and 21ᵃ insulated from each other and adapted to be engaged simultaneously by the opposed contacts 20 and 20ᵃ on the switch member 22. The contacts 21 and the heating elements 31 are mounted and electrically connected substantially the same as in the form shown in Figs. 1 to 3, and the contacts 20 and 20ᵃ of the two switches are also connected in the same manner to each other and to the heating elements 12 of the toaster. It will be seen that each switch is in the nature of a two-pole switch with the two poles 20 and 20ᵃ on one side of each switch electrically connected together.

A separate shunt circuit is, however, provided for each switch 18 from the wire terminal 36 to the insulated contact 21ᵃ, and a single rheostat 60 is preferably electrically connected to control the passage of current to both of the contacts 21ᵃ from the terminal 36. Thus the rheostat 60 has one side connected to the wire terminal 36 by a conductor 61, and from the other side of the rheostat a flexible conductor 62 extends and is connected in series to both of the insulated contacts 21ᵃ.

It will be seen that by adjusting the rheostat 60, the proportion of current flowing through the heating elements 12 and 31 may be varied with extreme accuracy whereby to vary the timing of the toasting operation and permit the user to produce uniform toast of the desired character.

From the foregoing it will be apparent that the invention provides a control device which is simple and inexpensive in its construction, and efficient in its operation.

It will also be seen that through employing a plurality of thermostats with individual heating elements therefor, the invention provides a control unit which in its operation will compensate automatically for any residual temperature which may be built up in the toasting chamber, regardless of whether or not the control unit is closely associated with the toasting chamber, and that the unit will, therefore, produce uniform toast irrespective of the frequency with which the associated toaster is operated.

Moreover, the use of a plurality of controlling thermostats, together with means operable to cause heating of the thermostats in rotation in successive operations, insures uniformity in successive operations even though the operations follow in rapid succession.

We claim as our invention:—

1. A control device comprising a pair of switches, thermostatic control means for each of said switches including heating elements controlled by their respective switches, a shunt circuit to each switch around the heating element of the switch arranged to be electrically connected to the heating element only when its switch is closed, and means for varying the relative resistances of said heating element circuits and said shunt circuits.

2. A timing device for governing the heating period of an electric heating element comprising a pair of switches operable separately to control the flow of current to said heating element, thermostatic control devices for each of said switches including auxiliary heating elements controlled by their respective switches, shunt circuits around each of said auxiliary heating elements and controlled by said switches, and a rheostat connected in controlling relation to both of said shunt circuits.

3. A timing device for governing the heating period of an electric heating element comprising, a pair of thermostatic control devices connected in parallel and each adapted to control a circuit to said heating element independently of the other, each device forming an over center switch and including a thermo-responsive element operable to open the switch and an auxiliary heating element energized when the switch is closed and causing said thermo-responsive element to open said switch after a period of predetermined length, and manual means for closing the switches, said means having operative engagement with the switches in invariable alternate succession to insure alternate control by the thermostatic devices.

4. A timing device for governing the heating period of an electric heating element comprising, in combination, means providing two normally open parallel circuits each adapted when closed to supply electric energy to said heating element, a thermostatic control device in each circuit including a pivotally mounted over center element operable by the control device after a predetermined period to break the circuit, and manual means operable to swing said element to close the circuit, said means comprising a rotatable shaft having two diametrically opposed radial projections disposed operatively to engage said elements in the rotation of said shaft, each projection engaging but one element to insure alternate closing of the switches.

5. A timing device for governing the heating period of an electric heating element, comprising, in combination, two normally open circuits adapted when closed to supply electric energy to said heating element independently, each of said circuits including a control device forming a switch comprising an over-center element carrying one of the switch contacts, a thermostatic element carrying the other switch contact and operable upon a rise in temperature to warp in a direction causing the switch to be opened by the snap action of said over-center element and an auxiliary heating element energized by closure of the switch and operating to cause said thermostatic element to open the switch after a predetermined period, and manual means for closing said switches in alternate succession comprising a rotatable shaft and means on said shaft engaging said over-center elements one after the other to move the elements to switch-closed position.

6. A control device for electric appliance to be operated in quick succession comprising, in combination, means providing two normally open circuits adapted when closed to supply electric energy to the appliance independently, means to render said circuits effective alternately for successive operation of the appliance, and an automatic timing device for each of said circuits including a thermostatic element and an electric heating element therefor energized as an incident to the supply of energy by such circuit to the appliance, said elements coacting to interrupt the circuit after a predetermined time interval, and a single manually operable means for simultaneously varying the positions of the thermostatic elements to determine the length of the control periods to be defined by both of said timing devices.

7. A control device for electric appliances to be operated in quick succession comprising, in combination, means providing a plurality of circuits having normally open switches therein and adapted when closed to supply electric energy to the appliance independently, means operable to close said switches one at a time and in a predetermined order for successive operations of the appliance, automatic timing devices for interrupting the respective circuits to define control periods of substantially uniform duration in successive operations of the appliance, each of said timing devices including an adjustably mounted thermostatic element and an electric heating element therefor arranged to be energized as an incident to the closure of the switch of the corresponding circuit by said switch closing means, and means for varying simultaneously the adjustment of said thermostatic elements to determine the duration of the control period to be defined by said timing devices.

8. A timing device for governing the heating period of an electric heating element, comprising, in combination, two normally open circuits adapted when closed to supply electric energy to the heating element independently, each of said circuits including a control device forming a switch comprising an over-center element carrying one of the switch contacts, a thermostatic element carrying the other switch contact and operable upon a rise in temperature to warp in a direction causing the switch to be opened by the snap actions of said over-center element and an auxiliary heating element energized by the closure of the switch and operative to cause said thermostatic element to open the switch after a predetermined period, and means for shifting said over-center elements alternately to close the respective switches in alternate succession.

JOSEPH E. BROSSEAU.
FRANK J. KERBER.